Figure 1:
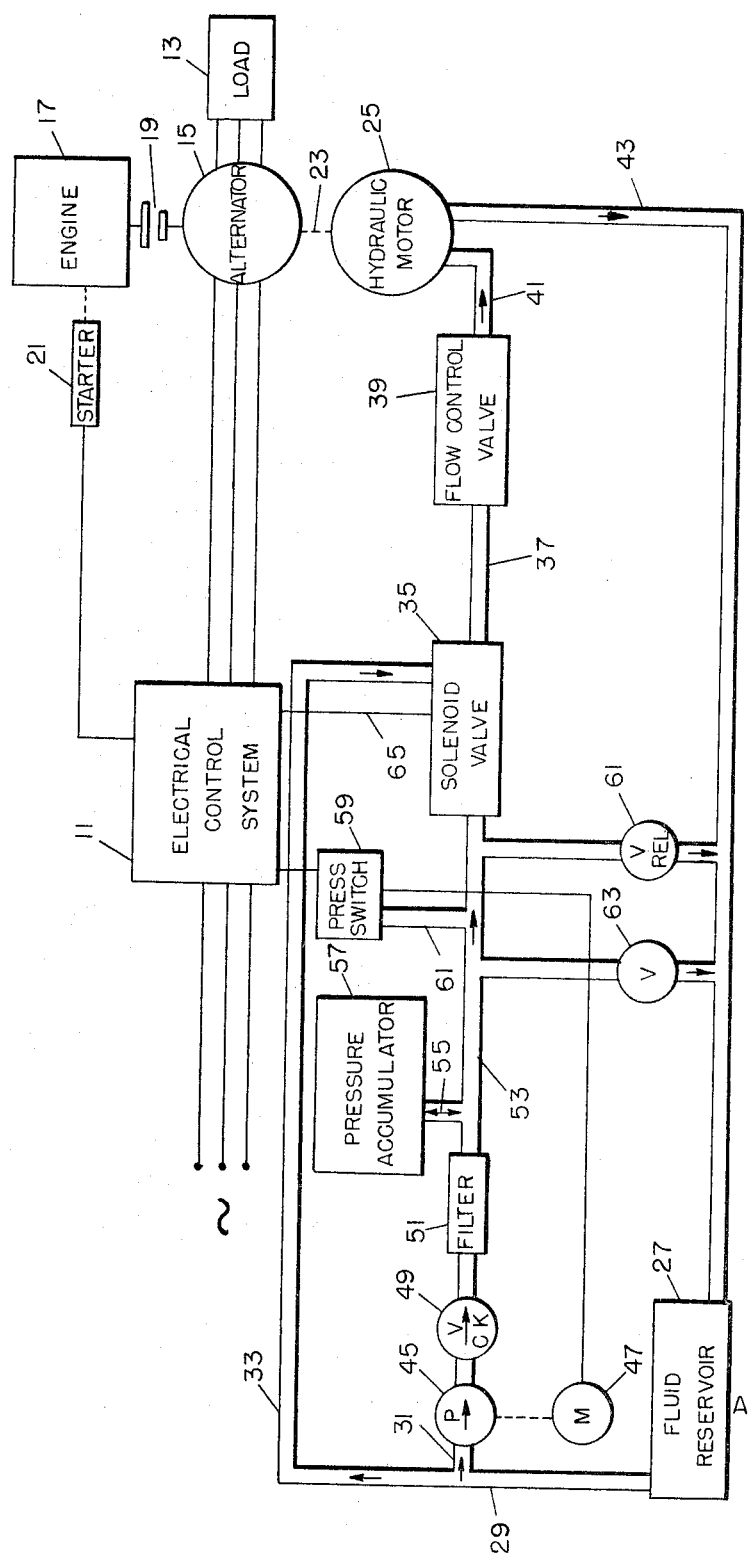

Nov. 1, 1966  A. BLOCH  3,283,165
NO BREAK POWER SYSTEM
Filed Aug. 22, 1963
2 Sheets-Sheet 1

INVENTOR
ALEXANDER BLOCH

INVENTOR
ALEXANDER BLOCH

United States Patent Office 3,283,165
Patented Nov. 1, 1966

3,283,165
NO BREAK POWER SYSTEM
Alexander Bloch, Norwalk, Conn., assignor to Dynamics Corporation of America, New York, N.Y., a corporation of New York
Filed Aug. 22, 1963, Ser. No. 303,894
7 Claims. (Cl. 290—4)

This invention relates generally to a standby power system and more particularly to a standby power system which utilizes an auxiliary hydraulic energy system.

It is now a fairly common practice to provide standby electrical generating sets which can be substituted for the main power supply lines when the normal power supply fails. The various standby sets used today have been refined in a number of ways in order to attempt to prevent any power outage whatsoever. These sets eliminate the previous required short period of time after breakdown before the standby equipment becomes fully operative to supply the required power.

One manner of providing power during this short period of time is to connect a generator to the normal power supply lines, the generator acting as a motor to turn a flywheel continuously during standby operation. In effect, this flywheel provides a stored mechanical energy so that, upon failure of the normal power supply, the flywheel continues to rotate the generator which feeds power back into the lines to the load, thus preventing interruptions commonly known as a power outage.

One of the limitations of the flywheel type unit results from the fact that the inertia of the flywheel creates the undesirable effect of not allowing the driving motor to follow the incoming frequency under normal power supply conditions. Therefore, when there are fluctuations in line frequency the motor becomes a generator and feeds power back into the lines. If the flywheel is reduced in size to eliminate this inertia effect, it does not have the necessary weight to supply power during the change-over process.

Another drawback of the flywheel type unit is that even though it prevents an actual power outage, it does not assure a constant voltage and frequency during the changeover. This is particularly important when the load being supplied is of a critical nature, such as found in most electronic systems in use today.

Accordingly, when critical loads are being served it is necessary to supplement the standby unit or to supply a different type of system to assure positive voltage and frequency characteristics during the changeover.

An object of this invention is to provide a system for instantaneous transfer of power to a standby unit with an insignificant change in frequency and voltage during the changeover.

A further object of this invention is to provide a standby power system having low power losses during standby condition and substantially no inertia losses.

A still further object of this invention is to provide a source of auxiliary hydraulic power for maintaining a stable supply during transfer of power to a standby unit.

Another object of this invention is to provide a standby power unit which includes stored hydraulic energy for providing electrical power when the normal power supply varies beyond acceptable limits of voltage and/or frequency.

Yet another object of this invention is to provide a standby power unit that is quieter and more compact than units presently in use.

Figure 2:
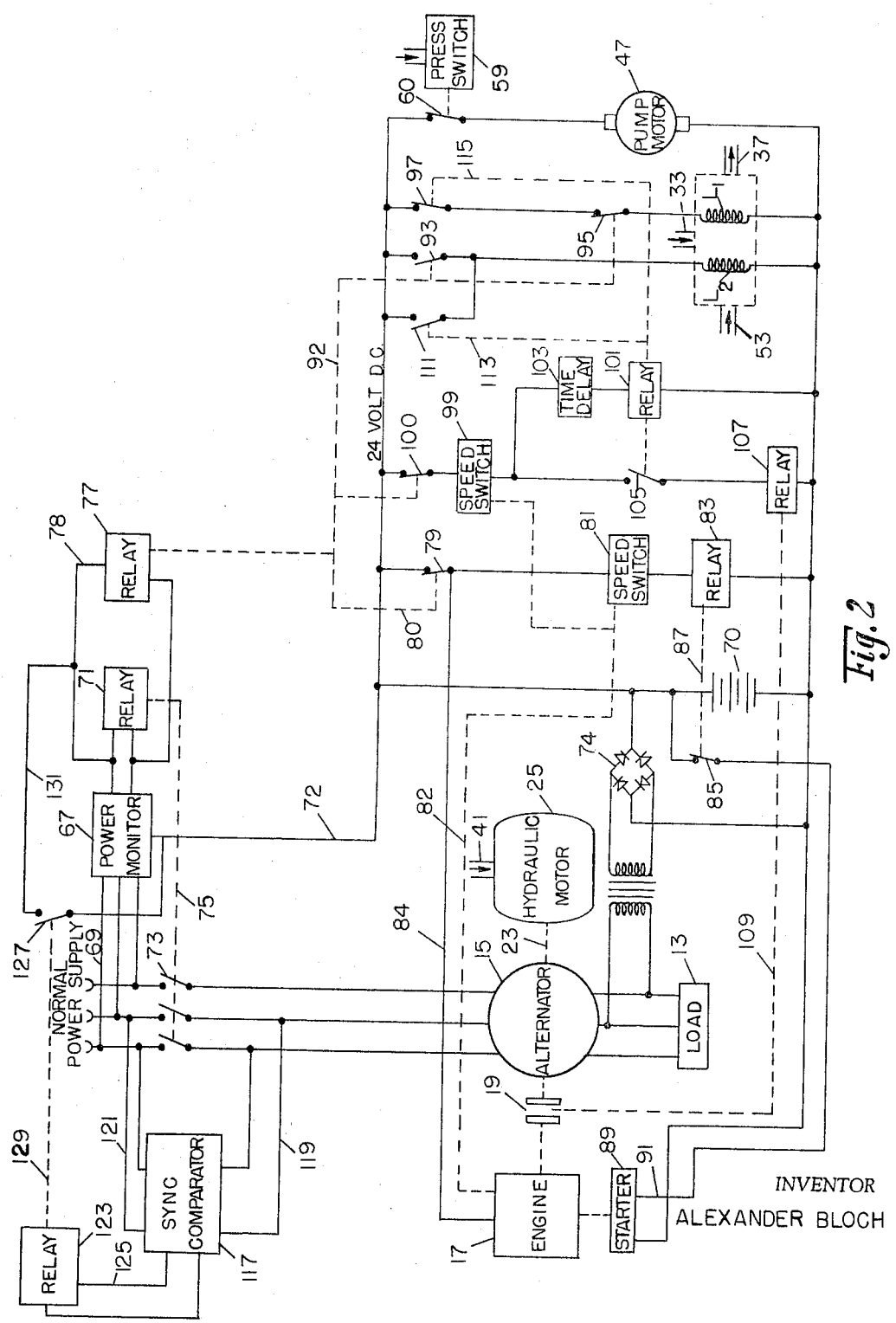

These and other objects will become apparent from the following description when taken in conjunction with the drawings wherein:

FIG. 1 is a schematic of the basic hydraulic system of the present invention; and FIG. 2 is a schematic of one type of electrical control system used in conjunction with the hydraulic system of FIG. 1.

Turning now more specifically to the drawings, FIG. 1 shows a three-phase power supply system being fed through an electrical control system 11, and an alternator 15 to a critical load 13. Also shown is the usual standby engine 17 which may be any of the well-known internal combustion type, connected to the alternator by means of a clutch 19. A starter 21, which is coupled to the engine, is activated by the electrical control system.

The particular alternator shown in FIG. 1 has dual shafts, with the shaft 23 being coupled to a hydraulic motor 25. During the period of normal power supply the alternator rotates and maintains the hydraulic motor 25 in an idling condition.

A reservoir 27 containing fluid such as oil is connected by means of conduits 29, 33 to a three-way solenoid valve 35. Under standby conditions, the solenoid valve is positioned such that conduit 33 is connected to conduit 37 allowing the oil to pass through flow control valve 39, and conduit 41 to the hydraulic motor. With the hydraulic motor in idling condition, the oil is recirculated back through conduit 43 to the fluid reservoir, thus maintaining a constant circulation of the fluid.

Reservoir 27 is also connected by means of conduit 31 to a fluid pump 45 which may be driven by a small electrical motor 47. The output of pump 45 passes through check valve 49 and filter 51 into conduit 53. Solenoid valve 35 blocks conduit 53 in the standby condition and pressure is created in conduit 53. This pressure is transferred by means of conduit 55 to a pressure accumulator tank 57. The electrical motor 47 is connected to the power supply through a pressure switch 59 which may be set for a predetermined pressure in the conduit 61 which is coupled to the pressure accumulator. When the desired pressure is reached, pressure switch 59 deenergizes motor 57.

Upon failure of the normal power supply, three-way solenoid valve 35 is actuated so as to block conduit 33 and open conduit 53 to conduit 37. The oil under high pressure from the accumulator 57 passes through the solenoid valve and through the flow control valve 39 into conduit 41 and drives hydraulic motor 25 with the fluid returning to the fluid reservoir 27 through conduit 43. Hydraulic motor 25 drives the alternator 15 by means of coupling 23, thereby continuing the power supply to the critical load 13. Flow control valve 39 is provided in order to maintain a constant speed in the hydraulic motor during the time that it carries the load. Since the hydraulic motor is idling during standby condition, the pressure from the accumulator has no initial motor torque to overcome.

The pressure system is designed so that the hydraulic motor carries the load during the time required for the engine starter 21 to start up engine 17, including the time required for the engine 17 to reach proper operating speed when the clutch 19 is coupled to the alternator 15.

FIG. 2 shows a schematic detail drawing of one type of electrical control system which may be used in conjunction with the hydraulic system of FIG. 1.

It is to be understood that in a compact system the various relays of FIG. 2 would include simple relay contacts for providing the functions described below. However, for the purposes of clarity in description, the various relays have been shown as operating associated switches.

A power monitor 67 is connected to the normal power supply lines by means of leads 69. This power monitor is a commercially available unit which may be set to monitor power over a definite period of time with a constant repetition of this time period monitoring. Such a power monitor determines voltage and frequency fluctuations, and when such fluctuations go beyond acceptable limits it actuates both relays 71 and 77 through lead 78.

Actuation of relay 71 opens the mainline switch 73 by means of coupling 75.

A rectifier 74 is connected between the alternator and the load in order to supply a low voltage D.C. supply, such as 24 volts, for the basic operation of the hydraulic system. A battery 70 is also connected into the system to provide available power for initiating the operation of the system for test purposes when there is no supply to the load.

In FIG. 2 the various switches are shown in the respective positions assumed at the instant of original actuation of relays 71 and 77.

Actuation of relay 77 closes normally open switch 79 for supplying D.C. power through the normally closed low speed switch 81 to the relay 83. Actuation of relay 83 closes the normally open switch 85 by means of coupling 87, thus supplying power to the starter 89 by means of lead 91. When engine 17 reaches a speed wherein the starter 89 is no longer needed, low speed switch 81 is opened by means of the coupling 82. This deenergizes relay 83 and opens the electrical circuit to the starter 89.

Actuation of relay 77 also opens the normally closed switch 93 and closes normally open switch 95 through coupling 92. During standby condition with switch 93 closed, coil L2 of the solenoid 35 is energized. Energization of coil L2 connects conduit 33 to conduit 37 (FIG. 1). When switch 93 is open and simultaneously switch 95 is closed, coil L2 is deenergized and coil L1 is energized coupling conduit 37 to conduit 53. The pressure from accumulator 57 is then transferred to the hydraulic motor 25 through conduit 41 which maintains the power supply to the load 13 through the alternator 15.

Actuation of relay 77 further closes normally open switch 100. However, high speed switch 99 is normally open and no power is passed therethrough until the engine reaches normal operating speed. When high speed switch 99 is closed by means of the coupling 82, power is supplied through a time delay network 103 to a relay 101. The time delay may, of course, be built into the relay 101 and is provided in order to allow the engine 17 to stabilize in speed.

Actuation of relay 101 closes normally open switch 105 providing actuating power to relay 107 which engages clutch 19 by means of coupling 109 in the well-known manner. When clutch 19 is engaged, engine 17 drives alternator 15 thus continuing the supply to the critical load 13.

Actuation of relay 101 simultaneously opens normally closed switch 97 deenergizing coil L1 and closes normally open switch 111 energizing coil L2. Deenergization of coil L1 and energization of coil L2 returns solenoid valve to the position whereby conduit 33 is again connected to conduit 37. Additionally, the drop in pressure in line 53 resulting from the fluid used to drive hydraulic motor 25 allows the pressure switch 59 to close switch arm 60, returning the power supply to the pump motor 47 whereby the hydraulic system may be recharged to its standby condition.

In order to insure that the load is not returned to the normal power supply until such supply is synchronized with the output of the alternator 15, a synchronous comparator 117 is connected across main line switch 73. As soon as the switch 73 is open comparator 117 will detect a difference between the output of the alternator and the normal power supply and will actuate relay 123 which closes normally open switch 127 through coupling 129. As long as switch 127 is closed, relays 71 and 77 will remain actuated. Therefore, even if the power monitor detects a temporary return of the normal power supply to within required limits, the system will not be returned to normal unless the power supply is synchronized with the output of the alternator.

Once synchronization occurs relays 71 and 77 are deenergized. Such deenergization opens switch 100, closes switch 93, and opens switch 95. Therefore, relay 101 is deenergized and switch 105 opens, deenergizing relay 107 and disengaging clutch 19. Relay 77 also opens switch 79, removing the power supply to the engine 17 whereby the engine shuts down. The entire system is returned to standby condition ready for a further operation.

It is to be understood that various modifications of the system illustrated and described above would fall within the scope of the invention.

In the hydraulic system, various valving arrangements could be employed such as the use of a check valve between conduit 33 and the input to the hydraulic motor 25. In such a system, a two-way solenoid valve could be used instead of the three-way valve 35.

In the electrical control system, various circuits and components could be employed to accomplish the same results. Additionally, several well-known types of clutches could be used between the engine and the alternator such as an over-running clutch which will engage when the engine reaches governed drive speed. With this type of clutch the relay 107 could be eliminated.

It should also be noted that a hydraulic starting motor could be used since hydraulic power is readily available with the present system. In such a case, the starting relay would actuate a valve connected between the starting motor and the high pressure side of the hydraulic system.

Although an entire standby unit is shown and described, the auxiliary hydraulic system of the present invention is easily adaptable to existing standby units wherein it is desirable to avoid any variation of voltage and/or frequency beyond acceptable limits.

I claim:

1. An auxiliary power system for temporarily supplying electrical current to a load during the period between power fluctuation of the normal power supply outside of acceptable limits and the substitution of power by an emergency power generating unit comprising, a fluid reservoir, a pump connected to said reservoir, a pressure accumulator connected to the output of said pump, a hydraulic motor, normally closed valve means connected between said pressure accumulator and said hydraulic motor, a recirculating system between said hydraulic motor and said reservoir by-passing said valve means, actuating means coupled to said valve means for opening said valve means upon said power fluctuation of said normal supply, an alternator, means for electrically connecting said alternator to said normal power supply and mechanical means coupled between said hydraulic motor and said alternator.

2. An emergency power system for temporarily supplying power to a load upon fluctuation of the normal power supply beyond a predetermined limit comprising, a fluid reservoir, a hydraulic motor, first conduit means connecting said reservoir to the fluid input side of said hydraulic motor for delivering fluid thereto, second conduit means connecting the fluid output side of said hydraulic motor to said reservoir for returning fluid to said reservoir, third conduit means connected between said reservoir and the fluid input side of said hydraulic motor, a motor driven pump connected in said third conduit, a pressure accumulator connected in said third conduit between said pump and said hydraulic motor, normally closed valve means in said third conduit between said pump and said hydraulic motor, actuating means for opening said valve means in response to said fluctuation of said normal power supply, an alternator, means for electrically connecting said alternator to said normal power supply, and mechanical means for coupling said alternator to said hydraulic motor.

3. The system of claim 2 further comprising means for blocking flow of fluid in said first conduit when said valve means is open.

4. The system of claim 2 further comprising pressure sensitive means coupled to said accumulator for preventing operation of said motor driven pump when the pressure within the accumulator is above a predetermined limit.

5. The apparatus of claim 2 further comprising an adjustable flow control valve in said third conduit between said accumulator and said hydraulic motor.

6. An emergency power system for temporarily supplying power to a load upon fluctuation of the normal power supply beyond predetermined limits comprising an alternator, means for coupling said alternator between said load and said supply, a hydraulic motor coupled to said alternator, conduit means connecting said hydraulic motor with said reservoir for recirculation, a pressure accumulator, pump means connected between said accumulator and said reservoir for providing a predetermined pressure in said accumulator, valve means for substantially simultaneously disconnecting said conduit means from said hydraulic motor and connecting said pressure accumulator to said hydraulic motor whereby said pressure from said accumulator drives said motor.

7. The system of claim 6 further comprising normal supply power monitoring means for actuating said valve means when said fluctuation exceeds said predetermined limits.

References Cited by the Examiner

FOREIGN PATENTS 750,270   6/1956   Great Britain.

MILTON O. HIRSHFIELD, *Primary Examiner.*

MAX L. LEVY, *Examiner.*

J. J. SWARTZ, *Assistant Examiner.*